(12) United States Patent
Zhu et al.

(10) Patent No.: US 10,797,283 B2
(45) Date of Patent: Oct. 6, 2020

(54) BATTERY MODULE (71) Applicant: CONTEMPORARY AMPEREX TECHNOLOGY CO., LIMITED, Ningde (CN)

(72) Inventors: Bangying Zhu, Ningde (CN); Feng Yu, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 119 days.

(21) Appl. No.: 15/969,646

(22) Filed: May 2, 2018

(65) Prior Publication Data
US 2018/0331337 A1 Nov. 15, 2018

(30) Foreign Application Priority Data

May 15, 2017 (CN) .......................... 2017 1 0339779

(51) Int. Cl.
*H01M 2/10* (2006.01)
*H01M 10/658* (2014.01)

(52) U.S. Cl.
CPC ........ *H01M 2/1077* (2013.01); *H01M 10/658* (2015.04); *H01M 2220/20* (2013.01)

(58) Field of Classification Search
CPC ............. H01M 2/1077; H01M 10/658; H01M 2220/20
See application file for complete search history.

(56) References Cited

U.S. PATENT DOCUMENTS

| 6,228,528 B1 * | 5/2001 | Burkholder | ............. H01M 2/10 429/121 |
| 2009/0246616 A1 * | 10/2009 | Koyama | ............. H01M 10/058 429/153 |

(Continued)

FOREIGN PATENT DOCUMENTS

| CN | 103119750 B | 6/2016 | |
| CN | 106654103 A * | 5/2017 | .......... H01M 2/1016 |

OTHER PUBLICATIONS

Cao Gen, Battery module end plate and battery module, CN106654103A, May 10, 2017, Google Patents English translation (Year: 2017).*

*Primary Examiner* — Jonathan G Leong
*Assistant Examiner* — Jacob Buchanan
(74) *Attorney, Agent, or Firm* — Morgan, Lewis & Bockius LLP (57) ABSTRACT

The present disclosure provides a battery module, which comprises a battery group, two end plates and two side plates. Each end plate has X direction groove portions respectively formed to two ends of the end plate in the X direction. Each side plate has: a body portion positioned at one of the two ends of the battery group in the X direction; and inserting portions respectively extending from two ends of the body portion in the Y direction toward the X direction. The inserting portions of each side plate are respectively inserted into the corresponding X direction groove portions of the end plates to limit relative movement between each side plate and the end plates in the Y direction to make each side plate and the end plates fixed and connected. Strength of the battery module is improved and the possibility in connection failure of the battery module is reduced.

2 Claims, 6 Drawing Sheets (56) References Cited

U.S. PATENT DOCUMENTS

| | | | |
|---|---|---|---|
| 2012/0003526 A1* | 1/2012 | Kume | H01M 10/441 429/151 |
| 2013/0108909 A1* | 5/2013 | Matsuo | H01M 2/1072 429/99 |
| 2013/0224524 A1* | 8/2013 | Nam | H01M 10/6555 429/7 |
| 2013/0244069 A1* | 9/2013 | Horii | H01M 2/1072 429/90 |
| 2014/0356690 A1* | 12/2014 | Kim | H01M 2/1077 429/156 |
| 2018/0175466 A1* | 6/2018 | Seo | H01M 10/6557 |

* cited by examiner

BATTERY MODULE

REFERENCE TO RELATED APPLICATIONS

The present application claims priority to Chinese patent application No. CN201710339779.3, filed on May 15, 2017, which is incorporated herein by reference in its entirety.

FIELD OF THE PRESENT DISCLOSURE

The present disclosure relates to the field of battery technology, and particularly relates to a battery module.

BACKGROUND OF THE PRESENT DISCLOSURE

In the assembling process of a battery module, batteries, two surfaces of which have been coated with adhesives, are sequentially stacked, two end plates are respectively placed to two ends of the stacked batteries and two side plates are respectively placed to two sides of the stacked batteries, the two end plates and the two side plates together enclose the stacked batteries to form a battery module. In order to ensure the anti-vibration stability of the battery module, enough quantity of adhesive needs to be respectively coated on the two surfaces of each battery, a size of the stacked batteries is adjusted to a prescribed size by a clamping tool which can apply pressure, and then the end plates and the side plates are fixed.

During use of the vehicle, the battery module needs to ensure that the end plates and the side plates are fixed so as to meet certain requirements of strength, such as the transient strength when the battery module is impacted, anti-fatigue strength during the long-term vibration subjected by the battery module, and, resisting swelling force due to charge and discharge of the batteries. The strength of the battery module is related to the safety performance, and if the strength on the fixation is not enough, it will result in that the structure of the battery module is disassembled and the function of the battery module fails, even short circuit and fire occur and in turn causes personal safety.

For assembling of the battery module in which each battery is square in shape, fixation methods used at present mainly include: bolt fixation that the end plates and the side plates are fixed by locking bolts, bandage fixation that a bandage is wound around the stacked batteries and fixes the stacked batteries, and end plate-side plate welding that lap surface regions of the end plate and the side plate are welded. However, because the bolt is easy to loose, connection reliability of the battery module using the bolt fixation is poor during the continuous vibration; anti-impact strength of the battery module using the bandage fixation is lower, the material of the bandage is lower in ability of resisting corrosion and aging, the connection reliability of the battery module is poor; the battery module using the end plate-side plate welding has high cost and the rate of scrapping, low assembling efficiency, and easily generate cracks inside the welded location, with the vibration of the battery module, the cracks will expand and finally result in failure of the connection between the end plates and the side plates.

SUMMARY OF THE PRESENT DISCLOSURE

In view of the problem existing in the background, an object of the present disclosure is to provide a battery module, in which assembling process is simple and assembling accuracy is high, connection reliability between the end plates and the side plates of the battery module is ensured.

In order to achieve the above object, the present disclosure provides a battery module, which comprises: a battery group including a plurality of batteries arranged in a Y direction; two end plates respectively positioned at two ends of the battery group in the Y direction; and two side plates respectively positioned at two ends of the battery group in a X direction. Each end plate has X direction groove portions respectively formed to two ends of the end plate in the X direction. Each side plate has: a body portion positioned at one of the two ends of the battery group in the X direction; and inserting portions respectively extending from two ends of the body portion in the Y direction toward the X direction. The inserting portions of each side plate are respectively inserted into the corresponding X direction groove portions of the end plates to limit relative movement between each side plate and the end plates in the Y direction to make each side plate and the end plates fixed and connected.

The present disclosure has the following beneficial effects: in the battery module according to the present disclosure, the two ends of each end plate in the X direction are respectively formed with the X direction groove portions, the two ends of the each side plate in the Y direction are respectively formed with the inserting portions, the end plates and the side plates clamp and fix the battery group by inserting each inserting portion into the corresponding X direction groove portion. After each inserting portion is inserted into the corresponding X direction groove portion, the relative movement between each side plate and each end plate in the Y direction is limited, so that the side plates and the end plates are assembled as an integral piece. With inserting connection between the end plates and the side plates, connection strength of the battery module is improved and the possibility in connection failure of the battery module is reduced. In addition, the inserting connection is simple and convenient, which simplifies the assembling process of the battery module, improves the assembling accuracy and ensures the connection reliability between the end plates and the side plates.

Reference numerals are represented as follows:

1 battery group
11 battery
12 heat insulation pad
2 end plate
21 X direction groove portion
211 step surface
22 Z direction position-limiting hole
23 Y direction groove portion 24 Y direction position-limiting hole
25 groove
S1 top surface
S2 narrow side surface
S3 wide side surface
S4 bottom surface
3 side plate
31 body portion
32 inserting portion
33 curling portion
34 Z direction through hole
35 folding portion
36 Y direction through hole
37 stopping portion
4 expansion nail
5 locking member
X direction
Y direction
Z direction

DETAILED DESCRIPTION

Hereinafter a battery module according to the present disclosure will be described in detail in combination with the figures.

Referring to FIG. 1 to FIG. 11, a battery module according to the present disclosure comprises: a battery group 1 including a plurality of batteries 11 arranged in a Y direction; two end plates 2 respectively positioned at two ends of the battery group 1 in the Y direction; and two side plates 3 respectively positioned at two ends of the battery group 1 in a X direction. Each end plate 2 has X direction groove portions 21 respectively formed to two ends of the end plate 2 in the X direction. Each side plate 3 has a body portion 31 positioned at one of the two ends of the battery group 1 in the X direction; and inserting portions 32 respectively extending from two ends of the body portion 31 in the Y direction toward the X direction. The inserting portions 32 of each side plate 3 are respectively inserted into the corresponding X direction groove portions 21 of the end plates 2 to limit relative movement between each side plate 3 and the end plates 2 in the Y direction so as to make each side plate 3 and the end plates 2 fixed and connected.

In the battery module according to the present disclosure, the two ends of each end plate 2 in the X direction are respectively formed with the X direction groove portions 21, the two ends of the each side plate 3 in the Y direction are respectively formed with the inserting portions 32, the end plates 2 and the side plates 3 clamp and fix the battery group 1 by inserting each inserting portion 32 into the corresponding X direction groove portion 21 (that is also a clearance fit). After each inserting portion 32 is inserted into the corresponding X direction groove portion 21, the relative movement between each side plate 3 and each end plate 2 in the Y direction is limited, so that the side plates 3 and the end plates 2 are assembled as an integral piece. With inserting connection between the end plates 2 and the side plates 3, connection strength of the battery module is improved and the possibility in connection failure of the battery module is reduced. In addition, the inserting connection is simple and convenient, which simplifies the assembling process of the battery module, improves the assembling accuracy and ensures the connection reliability between the end plates 2 and the side plates 3.

Figure 1:
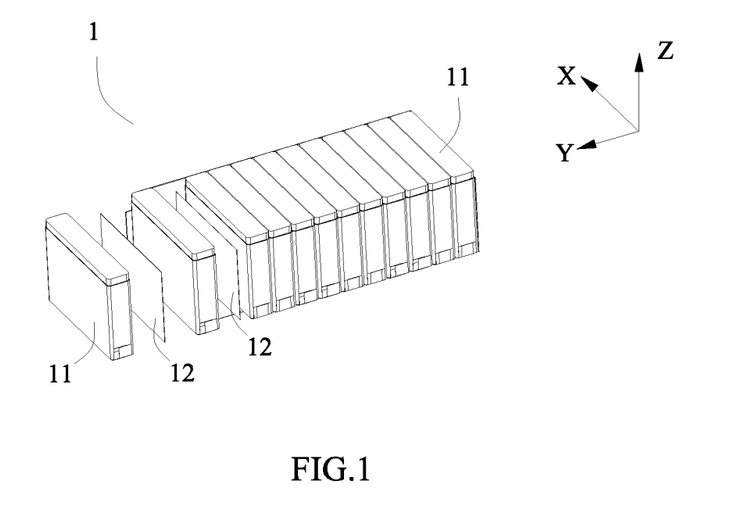
FIG. 1 is a perspective view of a battery group of a battery module according to the present disclosure, in which the battery group is not assembled completely.

Referring to FIG. 1, in the battery module according to the present disclosure, the battery group 1 may further comprise: heat insulation pads 12 respectively provided between two adjacent batteries 11. Each heat insulation pad 12 is adhered to the corresponding battery 11 by adhesive (not shown) and each heat insulation pad 12 is made of elastic material.

It should be noted that, when the battery module is assembled, firstly it needs to apply a pressure (a pressure range is determined by a force sensor) on the battery group 1 in the Y direction, and then the inserting portion 32 of each side plate 3 is inserted into the corresponding X direction groove portion 21 of each end plate 2. After the pressure is released, because of provision of the heat insulation pads 12, there is a certain tension between the end plates 2 and the side plates 3, which ensures the connection strength of the battery module. In addition, the heat insulation pad 12 elastically contacts two adjacent batteries 11 so that there are some elastic space in the battery module itself for expansion and contraction of the battery module.

Figure 4:
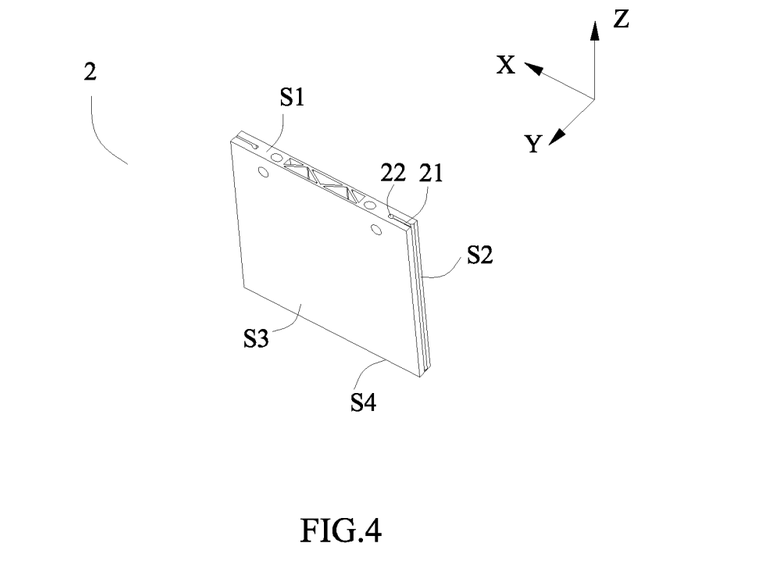
FIG. 4 is a perspective view of an end plate of FIG. 2.

Referring to FIG. 4, in the battery module according to the present disclosure, each end plate 2 has one top surface S1, two narrow side surfaces S2, two wide side surfaces S3 and one bottom surface S4. The X direction groove portions 21 of each end plate 2 extend downwardly from the top surface S1 of each end plate 2 in the Z direction and respectively extend from the narrow side surfaces S2 toward the X direction.

Figure 3:
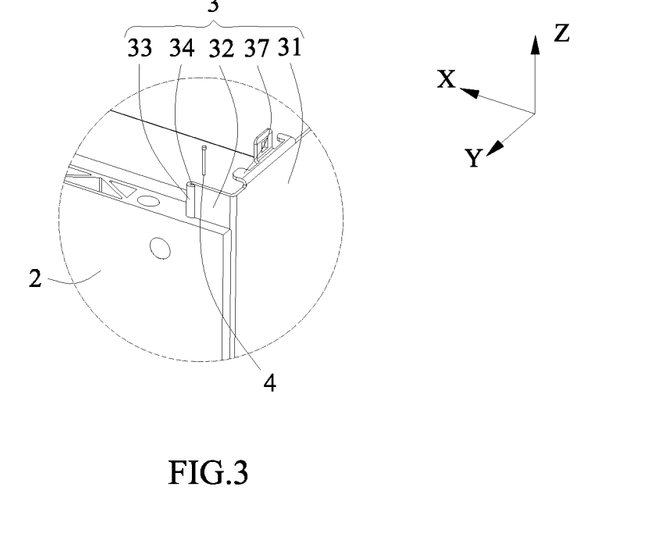
FIG. 3 is an enlarged view of a circle part of FIG. 2.

Referring to FIG. 4, in an embodiment, each end plate 2 may further have Z direction position-limiting holes 22, each Z direction position-limiting hole 22 extends from an end of each X direction groove portion 21 in the X direction toward the Z direction and communicates with each X direction groove portion 21. Referring to FIG. 3, each side plate 3 may further have curling portions 33, each curling portion 33 is formed at an end of each inserting portion 32 in the X direction. The curling portions 33 of each side plate 3 are respectively inserted into the corresponding Z direction position-limiting holes 22 of the end plates 2, so as to limit relative movement between each side plate 3 and the end plates 2 in the X direction. Here, a diameter of each Z direction position-limiting hole 22 is larger than a width of the corresponding X direction groove portion 21 in the Y direction, so as to ensure that relative movement between each side plate 3 and each end plate 2 in the X direction can be limited when each side plate 3 or each end plate 2 is subjected to a pulling force in the X direction.

Further referring to FIG. 4, each side plate 3 may further have Z direction through holes 34 respectively passing through the curling portions 33 of each side plate 3 in the Z direction. The battery module may further comprise expansion nails 4 respectively inserted into the Z direction through holes 34 after the curling portions 33 are respectively inserted into the Z direction position-limiting holes 22 and limiting relative movement between each side plate 3 and the end plates 2 in the Z direction under expansive force from the expansion nails 4. Here, when each expansion nail 4 is inserted into the corresponding Z direction position-limiting hole 22, because of the expansive action of the expansion nail 4, the expansion nail 4 tightly abut against the Z direction through hole 34 and the curling portion 33 tightly abut against the Z direction position-limiting hole 22, the curling portion 33 and the corresponding Z direction position-limiting hole 22 are interference fit to limit the relative movement between each side plate 3 and the end plate 2 in the Z direction.

Referring to FIG. 5 to FIG. 11, in the battery module according to the present disclosure, each end plate 2 may further have Y direction groove portions 23 respectively extending from the X direction groove portions 21 of each end plate 2 toward the Y direction and respectively communicating with the X direction groove portions 21 of each end plate 2. Each side plate 3 may further have folding portions 35 respectively extending from the inserting portions 32 of each side plate 3 toward the Y direction and respectively connecting with the inserting portions 32 of each side plate 3. When the inserting portions 32 of each side plate 3 are respectively inserted into the corresponding X direction groove portions 21 of the end plates 2, the folding portions 35 of each side plate 3 are respectively inserted into the corresponding Y direction groove portions 23 of the end plates 2 so as to limit the relative movement between each side plate 3 and the end plates 2 in the X direction.

Figure 5:
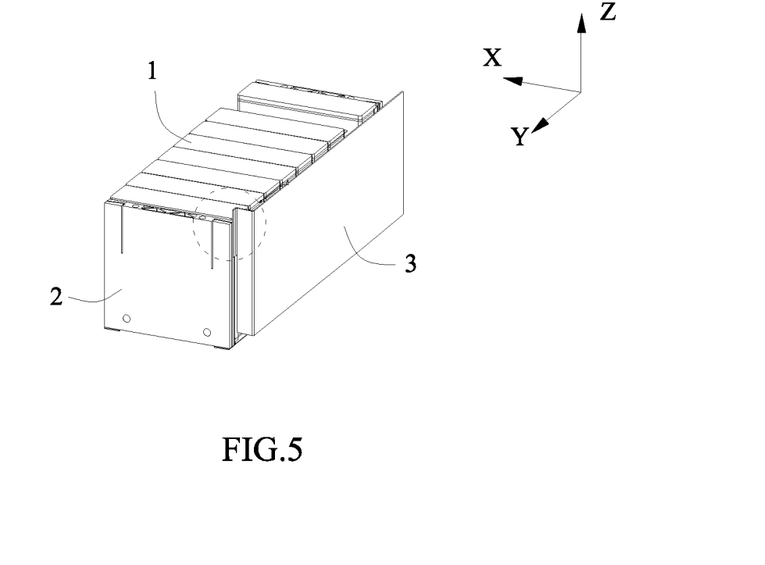
FIG. 5 is a varied example of FIG. 2.
Figure 6:
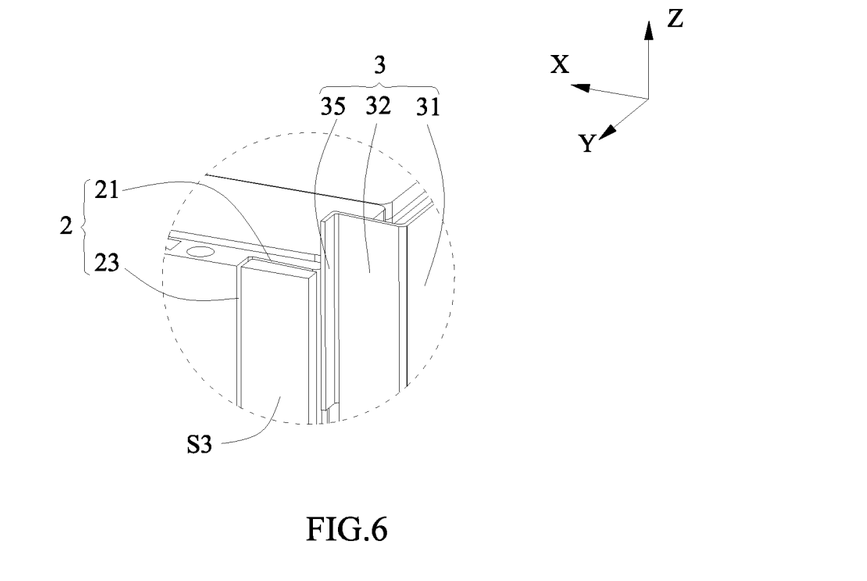
FIG. 6 is an enlarged view of a circle part of FIG. 5.

Referring to FIG. 5 and FIG. 6, in an embodiment, a top edge of the body portions 31 of each side plate 3 in the Z direction is flush with top edges of the inserting portions 32 of each side plate 3 in the Z direction, a projection of each X direction groove portion 21 in the X direction is rectangular.

Figure 7:
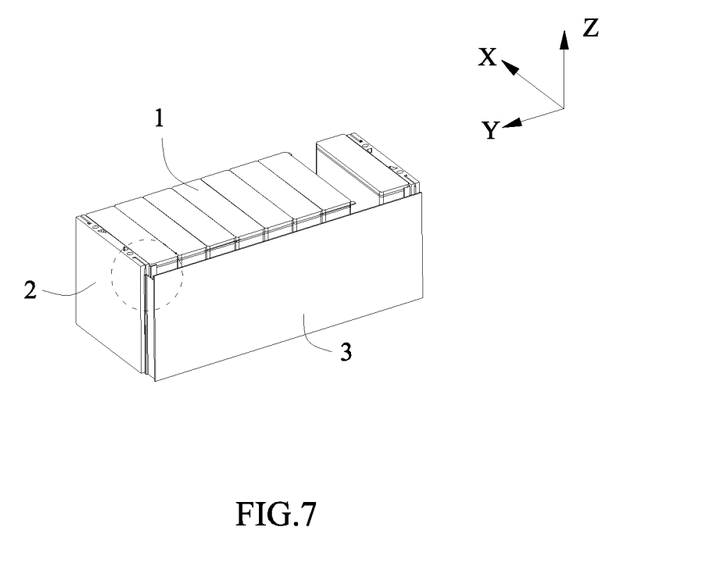
FIG. 7 is another varied example of FIG. 2.
Figure 8:
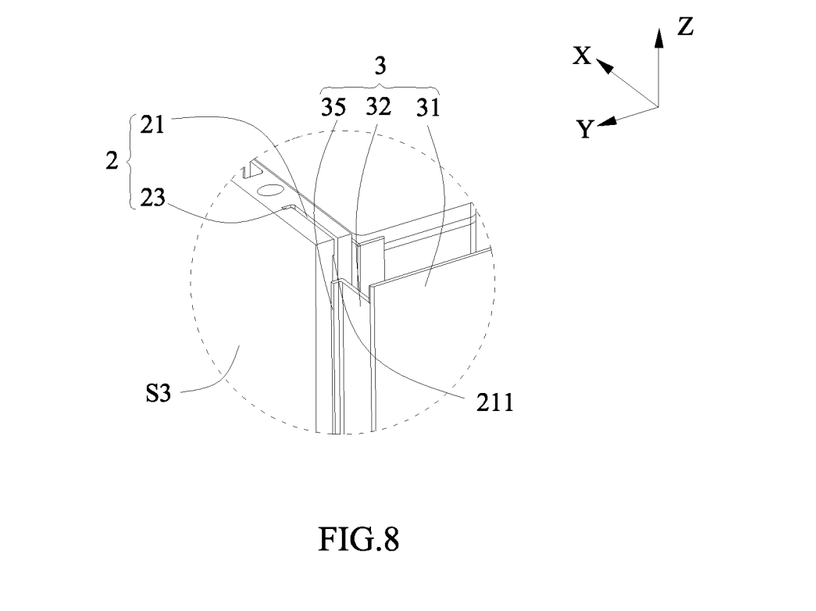
FIG. 8 is an enlarged view of a circle part of FIG. 7.

Referring to FIG. 7 and FIG. 8, in another embodiment, the top edge of the body portion 31 of each side plate 3 in the Z direction is higher than the top edges of the inserting portions 32 of each side plate 3 in the Z direction, a projection of each X direction groove portion 21 in the X direction is step-shaped, and a step surface 211 is formed in each X direction groove portion 21. After the inserting portions 32 are respectively inserted into the corresponding X direction groove portions 21 of the end plates 2 and the folding portions 35 of each side plate 3 are respectively inserted into the corresponding Y direction groove portions 23 of the end plates 2, the inserting portions 32 of each side plate 3 are respectively stopped on the step surfaces 211 of the corresponding X direction groove portions 21 of the end plates 2 so as to limit the relative movement between the side plate 3 and the end plates 2 in the Z direction.

Figure 9:
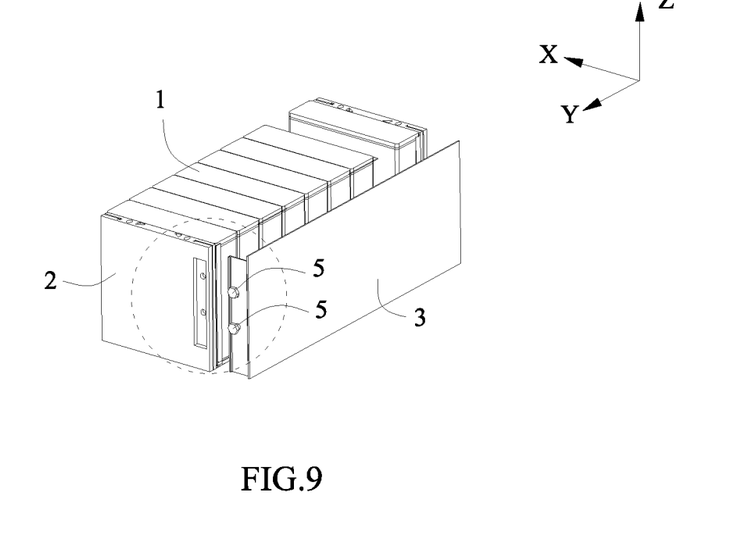
FIG. 9 is yet another varied example of FIG. 2.
Figure 10:
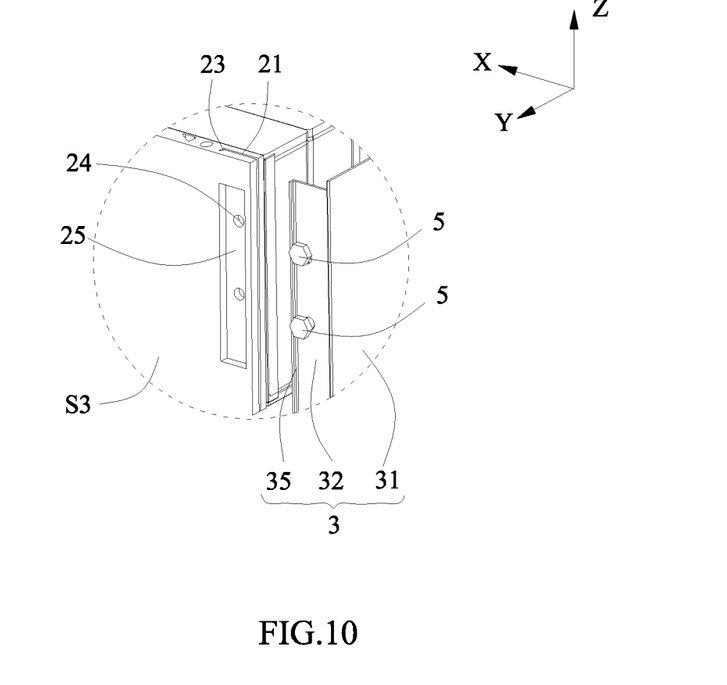
FIG. 10 is an enlarged view of a circle part of FIG. 9.
Figure 11:
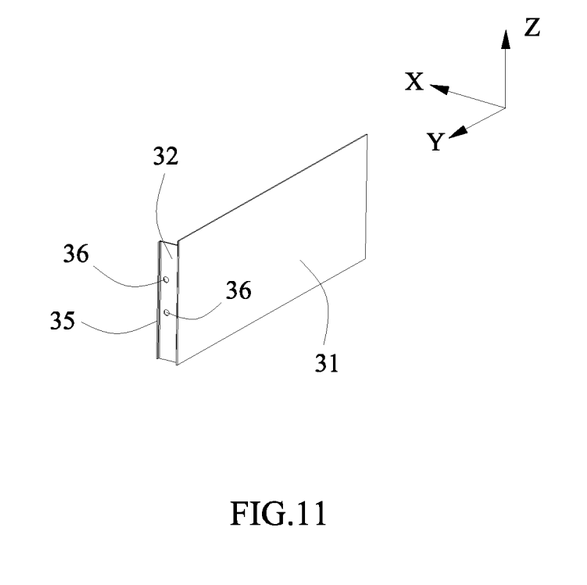
FIG. 11 is a perspective view of a side plate of FIG. 9.

Referring to FIG. 9 to FIG. 11, in another embodiment, each end plate 2 may further have Y direction position-limiting holes 24 respectively extending from the wide side surface S3 of the end plate 2 and respectively reaching the X direction groove portions 21 of each end plate 2. Each side plate 3 may further have Y direction through holes 36 respectively passing through the inserting portions 32 of each side plate 3 in the Y direction and respectively being coaxial with the corresponding Y direction position-limiting holes 24 of the end plates 2. The battery module may further comprise locking members 5, each locking member 5 is inserted into the Y direction position-limiting hole 24 of each end plate 2 and the Y direction through hole 36 of each side plate 3 so as to limit the relative movement between each side plate 3 and the end plates 2 in the Z direction. Here, the locking members 5 may be bolts, and the bolts lock the end plates 2 and the side plates 3 so as to limit the relative movement between each side plate 3 and each end plate 2 in the Z direction.

In the embodiment, further referring to FIG. 9 and FIG. 10, the wide side surface S3 of each end plate 2 may be further provided with grooves 25, the Y direction position-limiting holes 24 of each end plate 2 respectively extend from bottom surfaces of the grooves 25 of each end plate 2 and respectively reach the X direction groove portions 21 of each end plate 2. The grooves 25 can receive the whole bolt so as to avoid the bolt protrude from the wide side surface S3 of the end plate 2, thereby reducing the size of the whole battery module.

It should be noted that, when the bolt (specifically a head of the bolt) is exposed directly outside the end plate 2, the bolt is easily subjected to external force (such as due to drop or collision, etc. al), the external force will be transferred from the bolt to the end plate 2, and in turn to the battery group 1, thereby decreasing the service life of the battery module. However, the battery module of the present disclosure can completely hide the head of the bolt in the groove 25 and the head of the bolt will not protrude from the wide side surface S3 of the end plate 2 at an end of the battery module, thereby avoiding the above problem. Also, when the battery modules of the present disclosure form a battery pack, because the bolt will not protrude from the end plate 2 between adjacent battery modules, the occupied space of the battery pack is reduced, space utilization of the battery pack is improved. In addition, the end plate 2 and the side plate 3 are locked by the bolt, the side plate 3 is directly limited and the side plate 3 will not move in an axial direction of the bolt, when the battery module is subjected to a force in the axial direction, the bolt and the inserting portion 32 provide a double guarantee in strength, thereby avoiding the direct failure of the battery module due to looseness of the bolt.

Referring to FIG. 5 to FIG. 10, in the battery module according to the present disclosure, the Y direction groove portion 23 is formed at the end of the X direction groove portion 21 in the X direction, correspondingly, the folding portion 35 is formed at an end of the inserting portion 32 in the X direction. Certainly, the Y direction groove portion 23 also may be formed at the other position of the X direction groove portion 21 in the X direction, and the folding portion 35 may be formed at a position of the inserting portion 32 corresponding to the Y direction groove portion 23. Further referring to FIG. 5 and FIG. 6, the Y direction groove portion 23 extend to the wide side surface S3 of the end plate 2 in the Y direction.

Figure 2:
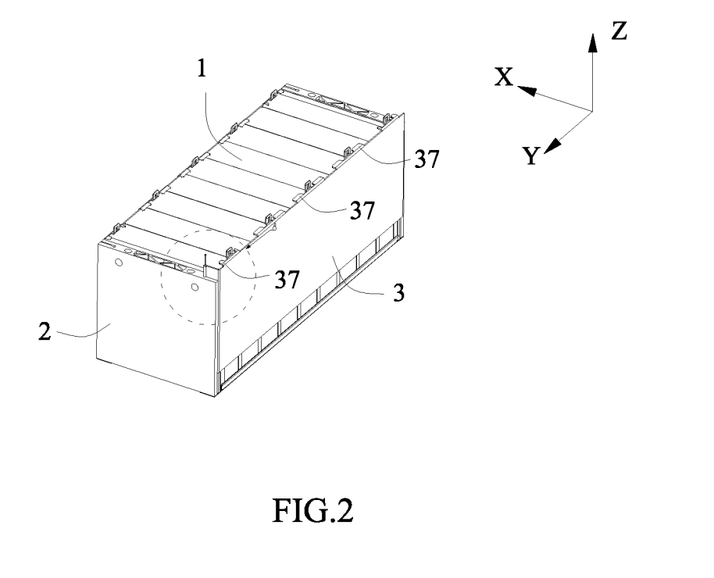
FIG. 2 is an assembled perspective view of the battery module according to the present disclosure.

Referring to FIG. 2 and FIG. 3, in the battery module according to the present disclosure, each side plate 3 may further have a stopping portion 37 extending from a top surface of the body portion 31 in the Z direction toward the X direction. The stopping portion 37 can be provided as multiple in number, the multiple stopping portions 37 are spaced apart from each other and arranged along the Y direction. Here, after the two side plates 3 and the two end plates 2 are fixed, each stopping portion 37 is positioned above the battery group 1 to limit the movement of the battery group 1 in the Z direction.

What is claimed is:

1. A battery module, comprising:
   a battery group including a plurality of batteries arranged in a Y direction;
   two end plates respectively positioned at two ends of the battery group in the Y direction; and
   two side plates respectively positioned at two ends of the battery group in an X direction;
   wherein
   each end plate has X direction groove portions respectively formed to two ends of the end plate in the X direction;
   each side plate has: a body portion positioned in one of the two ends of the battery group in the X direction; and inserting portions respectively extending from two ends of the body portion in the Y direction toward the X direction;
   the inserting portions of each side plate are respectively inserted into the corresponding X direction groove portions of the end plates to limit relative movement between each side plate and the end plates in the Y direction, and make each side plate and the end plates fixed and connected;

each end plate has one top surface, two narrow side surfaces, two wide side surfaces and one bottom surface;

the X direction groove portions of each end plate extend downwardly from the top surface of the end plate in a Z direction and respectively extend from the narrow side surfaces toward the X direction;

each end plate further has Z direction position-limiting holes, each Z direction position-limiting hole extends from an end of each X direction groove portion in the X direction toward the Z direction and communicates with the X direction groove portion; each side plate further has curling portions, each curling portion is formed at an end of each inserting portion in the X direction; the curling portions of each side plate are respectively inserted into the corresponding Z direction position-limiting holes of the end plates to limit relative movement between each side plate and the end plates in the X direction; and a diameter of each Z direction position-limiting hole is larger than a width of the corresponding X direction groove portion in the Y direction.

2. The battery module according to claim 1, wherein each side plate further has Z direction through holes respectively passing through the curling portions of each side plate in the Z direction;

the battery module further comprises expansion nails respectively inserted into the Z direction through holes after the curling portions are respectively inserted into the Z direction position-limiting holes and limiting relative movement between each side plate and the end plates in the Z direction under expansive force from the expansion nails.

\* \* \* \* \*